United States Patent
McCarty

[15] 3,678,499
[45] July 18, 1972

[54] ELECTRONIC DIGITAL CLOCK POWER FAILURE INDICATOR

[72] Inventor: Clyde W. McCarty, Woodville, Mass.
[73] Assignee: General Electric Company
[22] Filed: Oct. 27, 1970
[21] Appl. No.: 84,410

[52] U.S. Cl. .......................... 340/336, 315/129, 315/134, 340/253 C
[51] Int. Cl. .................................................. G08b 29/00
[58] Field of Search ............... 315/129, 134, 136; 340/336, 340/248 B, 253 C, 324 R, 334

[56] References Cited
UNITED STATES PATENTS

| | | | |
|---|---|---|---|
| 3,013,257 | 12/1961 | Ippolito | 315/129 |
| 3,161,867 | 12/1964 | Isborn | 340/336 |
| 3,461,443 | 8/1969 | Vasel | 315/134 |

Primary Examiner—John W. Caldwell
Assistant Examiner—Marshall M. Curtis
Attorney—Lawrence R. Kempton, Leonard J. Platt and John F. Cullen

[57] ABSTRACT

A power failure indicator for an electronic digital clock or similar electronic device with numeral readout components wherein an indicator segment of one of the numeral readout components is utilized for indicating a power failure.

4 Claims, 3 Drawing Figures

Patented July 18, 1972

Inventor:
Clyde W. McCarty
by Zerrard J Platt
Attorney

ELECTRONIC DIGITAL CLOCK POWER FAILURE INDICATOR

BACKGROUND OF THE INVENTION

This invention relates to a power failure indicator, and more particularly, to a power failure indicator for an electronic digital clock or similar device which includes numeral readout tubes.

In a co-pending application of Paul Emerson, Hans Thamhain and Bruce McIntosh, Ser. No. 25,930, filed Apr. 6, 1970, and assigned to the same assignee as the instant invention, there is disclosed an electronic clock which utilizes a plurality of binary counters for counting minutes, tens of minutes and hours, and it also includes four seven-bar vacuum readout tubes for successively displaying the desired time indicating decimal numerals. One seven-bar tube displays minutes, another seven-bar tube displays tens of minutes, a third numeral tube displays hours and a fourth numeral tube displays the tens of hours for indicating a numeral "1" for the hours 10, 11 and 12 in the usual decimal system for indicating time. The clock also includes a plurality of frequency dividers for performing successive divisions on the 3,600 pulses per minute of the readily available 60Hz signal from conventional house wiring.

While electronic digital clocks of the type disclosed in the aforementioned co-pending application may include a secondary source of power for supplying standby power to binary counters to permit counting to continue even though a power line failure has occurred, it can be appreciated that the usual electronic oscillator controlled frequency of a secondary power supply does not have a frequency which is as accurate as the 60-cycle frequency which is impressed on the usual power lines by a remote power station.

Accordingly, in such electronic digital readout clocks with or without a secondary power supply, it is especially desirable that there be some means for indicating that there has been a power line interruption. Otherwise, such a clock which is normally controlled by the power line frequency would operate after a line power failure to display a time of day which is inaccurate.

It is also especially desirable to be able to utilize existing components of such electronic digital clocks for indicating that a power failure has occurred.

Correspondingly, it is a primary object of this invention to provide a reliable and effective power failure indicator for an electronic digital clock which utilizes existing components of such a clock.

SUMMARY OF THE INVENTION

In accordance with one of the aspects of this invention a numeral display device is provided with a plurality of numeral readout components and each of the readout components includes a plurality of indicator segments for forming and displaying different numerals. One of the segments which is not normally required as a numeral forming segment is selected to be a power failure indicator segment. A bi-stable circuit is connected between the power supply and the power failure indicator segment for causing the power failure indicator segment to glow upon reapplication of the power supply to the bi-stable circuit after a power failure. The bi-stable circuit also include a switch or other device for extinguishing the power failure indicator segment after the numeral indicating readout components have been reset following a power failure.

By this arrangement, a power failure indicator is readily provided for an electronic digital clock by utilizing a normally unused indicator segment of a numeral readout component of such a clock. Thus, a very simple yet effective and reliable power failure indicator for an electronic digital clock or similar device is provided which utilizes a minimum number of additional components.

BRIEF DESCRIPTION OF THE DRAWINGS

Other aspects and attendant advantages of the invention will be apparent from the following description taken in connection with the drawings in which.

DESCRIPTION OF THE PREFERRED EMBODIMENT

Figure 2:
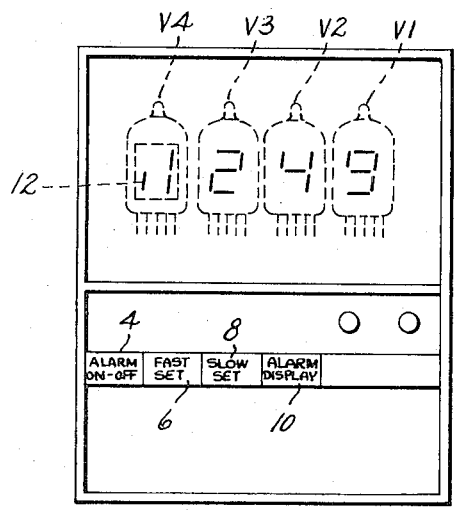
FIG. 2 is a front elevational view of a 4-tube electronic digital readout clock including the circuit and tube depicted in FIG. 1.

Referring now to the drawings, and first particularly to FIG. 2, there is shown an electronic digital clock which includes my unique power failure indicator. As illustrated, the clock includes four seven-bar display tubes V1, V2, V3 and V4 for providing a visual display of minutes, tens of minutes, hours and tens of hours. It can be appreciated that tube V1 displays minutes, tube V2 displays tens of minutes, tube V3 displays hours, and tube V4 displays tens of hours. It can also be appreciated that in order to form the numeral 9 depicted by the tube V1, six segments of the tube V1 are required. In order to form the numeral 4 depicted by the tens of minutes tube V2, four indicator segments are required, to form the numeral 2 shown by the tube V3, five indicator segments are required, and in order to form the numeral 1 depicted by tube V4, only two indicator segments are required. Thus, in the usual decimal system for indicating time, the left hand tube V4 only displays a numeral 1 for indicating the first numeral of hours 10, 11 and 12, and the remaining five segments of the tube are never required for forming a time displaying numeral.

A plurality of setting buttons 4, 6, 8 and 10 are arranged in a row below the seven-bar numeral display tubes. A fast-set button is identified by reference numeral 6, and a slow-set button is identified by reference numeral 8. With this arrangement, after the electronic digital clock has been plugged into the 60Hz power line supply of conventional house wiring, the numerals of the clock may be set by first pressing the fast-set button to advance the numerals to indicate a time close to the correct time, and then the slow-set button may be depressed to complete the time setting operation.

The structure so far described is illustrated and described in fuller detail in the aforementioned application of Paul Emerson, Hans Thambain and Bruce McIntosh. The co-pending application also describes and illustrates in considerable detail a schematic diagram of a preferred input output circuit for the electronic digital clock along with diagrams showing the frequency dividers and the binary numeral counters of the digital clock. The clock takes the 60-cycle per second frequency from the house wiring and performs successive divisions on the 3,600 pulses per minute of the 60-cycle frequency to obtain an intermediate signal of one pulse per minute. Then it takes the 1 pulse per minute and sends it to a binary minute counter. The binary minute counter counts the pulses in binary numbers. When the binary number 1010 (corresponding to decimal number 10) is reached, it sends a pulse to a binary 10 minute counter. The binary 10 minute counter counts a pulse every 10 minutes and sends a pulse per hour to the clock binary hour counter. Electronic strobe circuits are provided for successively sending the numbers which are being counted by the binary minute counter, the binary 10 minute counter and the binary hour counter to a decoder, and as expected, the decoder decodes the hour, 10 minute, and minute binary numbers to decimal numbers. After all of this, the decoded decimal numbers are successively applied to the four seven-bar readout tubes V1, V2, V3 and V4.

POWER FAILURE INDICATOR

In accordance with my invention a power failure indicator is uniquely incorporated into the electronic digital clock shown in FIG. 2 by utilizing the lower left display segment 12 of tube V4 as a power failure indicator.

Figure 1:
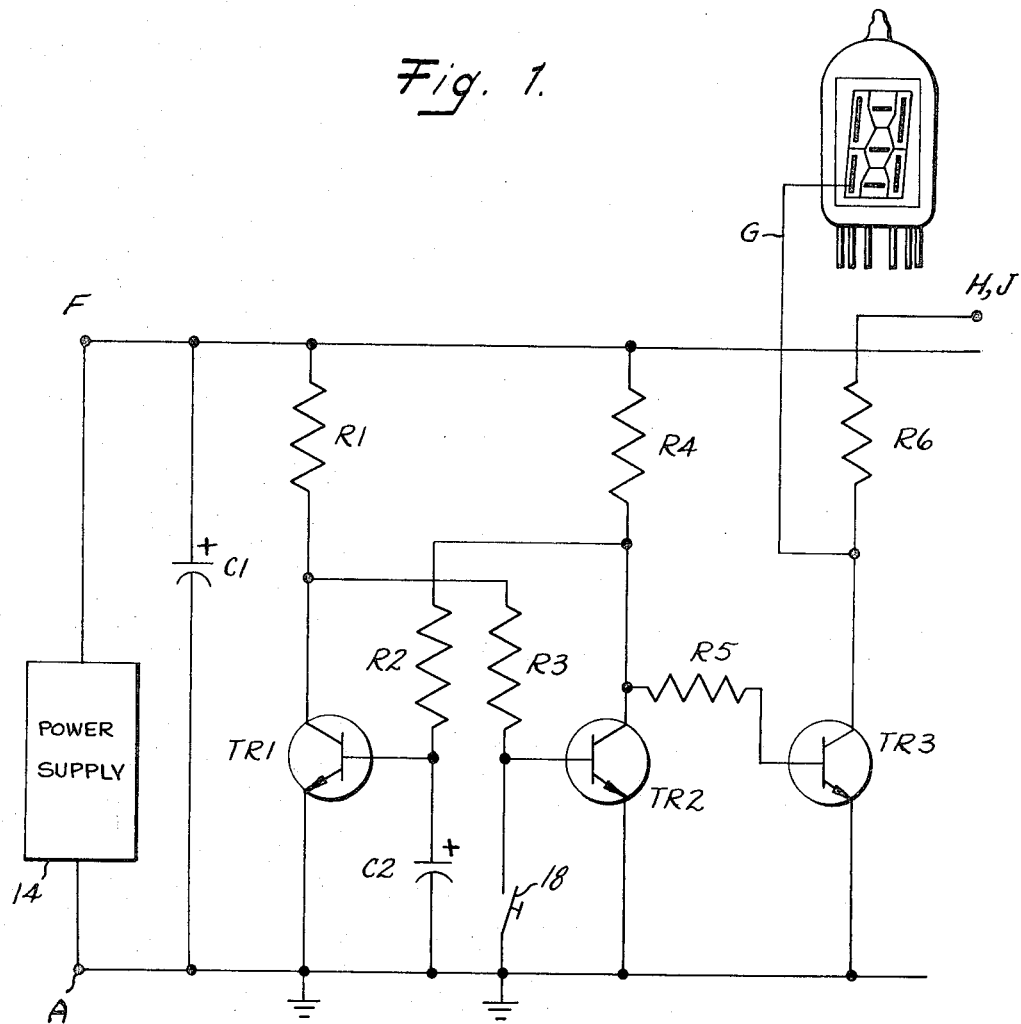
FIG. 1 is a schematic diagram of a preferred power failure circuit including the left hand power failure indicator tube for an electronic digital clock which includes a plurality of seven-bar numeral readout tubes.

A bi-stable transistor circuit for causing the lower left indicator segment 12 of tube V4 to glow upon reapplication of the 60Hz power supply is illustrated in FIG. 1. As shown the bi-stable circuit is connected to a power supply 14. The power supply 14 may be similar to the 60-cycle transformer controlled power supply shown and described in the aforementioned application or it may be somewhat different, and may be provided with a transistor frequency controlled secondary power supply for supplying standby power to the clock following a power line failure.

Figure 3:
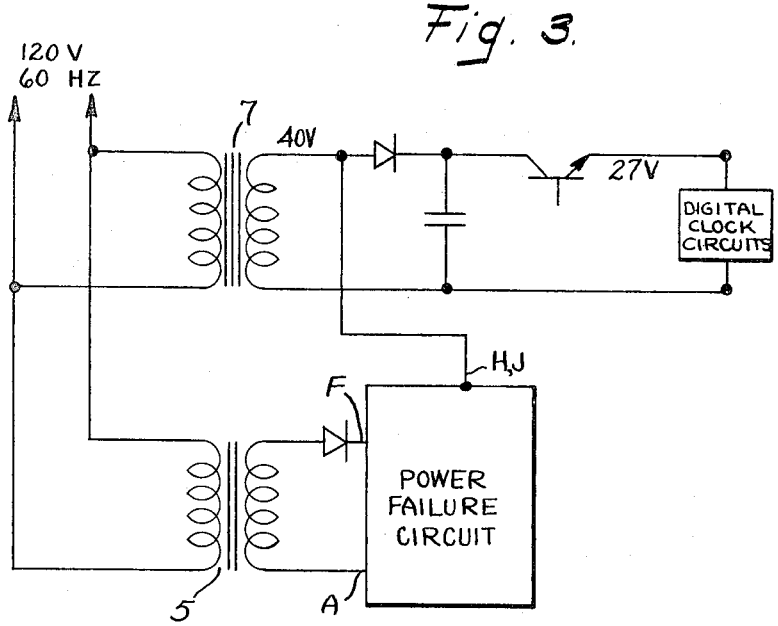
FIG. 3 is a schematic and block diagram of a preferred power supply arrangement for an electronic digital clock in which my unique power failure indicator circuit may be utilized.

Referring in particular to FIGS. 1 and 3, my improved power failure indicator circuit shown in FIG. 1 may be preferably included in a power supply arrangement as illustrated in FIG. 3. A transformer 5 on an inverter board shown in FIG. 3 supplies approximately 8 volts of power for the power failure indicator circuit. Capacitor C1 of the power failure indicator circuit is a part of the filtering of the power supply.

With reference to FIGS. 1 and 3, it can also be seen that a transformer 7 may be utilized for supplying approximately 40 volts to resistor R6 of the power failure indicator circuit, and a regulated 27 volts is supplied to the digital clock circuits.

Referring to FIG. 1, a transistor TR1 is connected to the (+) side of the 8 volt power supply through resistor R1, the resistor R1 being connected to the collector of the transistor, and the emitter of the transistor being connected to ground.

The transistor TR1 is arranged in a bi-stable flip-flop circuit with transistor TR2 for turning transistor TR3 off or on to control signal bar 12. When transistor TR2 conducts, its collector goes low, thereby turning off transistor TR3. With transistor TR3 turned off, the indicating signal bar 12 is in effect connected to the 40 volt supply through a 10,000 ohm resistor R6, and hence, the indicating segment 12 glows. The segment 12 draws about 1 milliamp of current, thereby causing a drop of about 10 volts in resistor R6 leaving the segment at 30 volts.

It can be seen that a load resistor R4 having a value of approximately 10K is positioned between the power supply and transistor TR2.

Resistors R2 and R3 are cross-coupling or feedback resistors which are connected to the base of transistors TR1 and TR2, respectively, and the collectors of transistors TR2 and TR1, respectively. Each of the resistors has a value of approximately 100K.

A coupling resistor R5 having a value of approximately 47K is positioned between the base of transistor TR3 and the collector of transistor TR2.

Capacitor C2 functions as a delay device. When power is initially applied to the circuit, transistor TR2 will conduct because its base will immediately go high before the delay capacitor C2 can charge through resistors R2 and R4.

A grounding switch 18 is positioned between the base of transistor TR2 and ground for grounding the base of transistor TR2 to turn it and the power failure indicator segment 12 off after the indicator segment has appropriately indicated a power failure. Preferably, the switch 18 is tied in with the slow-set button 8 so that upon depressing the slow-set button 8 to provide a final setting of the digital clock numerals the act of final setting will also close the grounding switch 18 to turn off the power failure indicator segment 12.

OPERATION

With particular reference to FIG. 1 it can be seen that the bi-stable flip-flop circuit functions to cause the indicator segment 12 to glow upon reapplication of power line frequency following a power failure. Under normal operating conditions before a power failure transistor TR3 is conducting, its collector is near "0," and thus, the power indicator segment is at a low voltage and the segment does not glow. When a power failure occurs the voltage at point F which is normally 8 volts drops somewhat as capacitor C1 discharges through resistor R1 and transistor TR1. After a few seconds the discharge of capacitor C1 is essentially complete. When power returns, point F which is normally held at 8 volts goes high. At this time, transistor TR2 will conduct because its base will immediately go high before C2 can charge through resistors R2 and R4. Thus, the collector of transistor TR2 and the base of transistor TR3 will go low, turning off transistor TR3 and causing the voltage at the power failure indicator segment 12 to rise. With transistor TR3 turned off the voltage at the indicator segment 12 rises to the voltage at H, J less the drop of resistor R6 which would be about 10 volts. The power failure indicator segment 12 is thus energized and continues to glow until transistor TR2 is turned off by grounding its base by means of grounding switch 18 which is preferably operated by the slow-set button 8 of the electronic digital clock.

From the foregoing description, it will be appreciated that my unique power failure indicator for an electronic digital clock or a similar electronic device with numeral readout components is achieved with the use of a minimum number of additional electronic components which may be readily added to an existing electronic circuit. Significantly, the power failure indicator itself, namely signal bar 12, is obtained without the use of any additional parts since the bar 12 is a normally unused bar of a seven-bar numeral forming tube which is only normally required to form the numeral 1 of the hours 10, 11 and 12.

Thus, an exceedingly simple, yet reliable and effective power failure indicator for an electronic digital clock or similar electronic device with numeral readout components has been achieved.

I claim:

1. An electronic numeral display device having a power failure indicator circuit comprising:
   a. a numeral display device having a plurality of numeral readout components, each of said readout components having a plurality of indicator segments for forming and displaying a plurality of different numerals;
   b. one of the numeral forming segments of one of the numeral readout components being a power failure indicator segment;
   c. a power supply;
   d. a bi-stable circuit connected between the power supply and the power failure indicator segment of said one of said numeral readout components for causing said power failure indicator segment to glow upon reapplication of the power supply to said bi-stable circuit after a power failure; and
   e. means positioned in said bi-stable circuit for extinguishing said power failure indicator segment after the numeral indicating readout components have been reset following a power failure.

2. A power failure indicator circuit for an electronic digital device comprising:
   a. a numeral readout component including an electronic indicator segment;
   b. a power supply;
   c. a bi-stable transistor circuit connected between the power supply and the indicator segment of said numeral readout component;
   d. a first transistor in said bi-stable circuit, said transistor having a capacitor connected from the base of the transistor to the emitter of the transistor;
   e. a second transistor in said bi-stable circuit which is arranged to conduct when power is first supplied to the circuit for causing the indicator segment to glow when power is first supplied to said bi-stable circuit; and
   f. a switch positioned between the base and the emitter of said second transistor for grounding the transistor to thereby permit conduction of the first transistor and to turn off the power failure indicator segment of the numeral readout component.

3. A power failure indicator circuit for an electronic digital clock having a plurality of seven-bar vacuum tubes for reading out the time of day in decimal numerals comprising:
   a. a bi-stable circuit including three transistors;
   b. a capacitor connected from the base to the emitter of one of said transistors for preventing conduction of said one transistor when power is first supplied to said bi-stable circuit;
   c. one of the tubes having a luminescent-anode bar connected to the bi-stable circuit for causing the luminescent-anode bar to glow upon reapplication of the power supply to said power failure circuit; and,
   d. a switch positioned between the base and emitter of said second transistor for grounding the base of said second transistor to thereby permit conduction of the first transistor and increase the voltage applied to the base of the third transistor thereby reducing the voltage at the luminescent-anode bar to thereby prevent the bar from glowing.

4. A digital clock comprising:
   a. four 7-segment readout tubes for indicating the time of day, the first readout tube being utilized for indicating minutes, the second readout tube being utilized for indicating tens of minutes, the third readout tube being utilized for indicating hours, the fourth readout tube being utilized for indicating tens of hours, and the lower left bar of said fourth seven-bar readout tube being utilized for indicating a power failure;
   b. a flip-flop circuit including two transistors for turning a third transistor on or off to control the lower left signal bar;
   c. one of the transistors of said flip-flop circuit having a capacitor connected from base to emitter for preventing conduction of said transistor when power is first supplied to said flip-flop circuit;
   d. the other transistor being connected to the power input of said flip-flop circuit so that said second transistor conducts when power is initially supplied to the flip-flop circuit;
   e. the collector of said other transistor being connected to the base of said third transistor so that upon initial application of the power supply to said flip-flop circuit the base of the third transistor will go low turning off the third transistor and causing the lower left signal bar to glow to indicate that the power supply has been interrupted and that power is now being supplied to the digital clock; and
   f. a switch positioned between the base and the emitter of said other transistor for grounding the base of said other transistor to turn it off and to thereby cause its collector to go high to permit conduction of the first transistor of said bi-stable flip-flop circuit to cause the collector of the third transistor to go low to turn off the indicator.

* * * * *